US008433350B2

(12) United States Patent
Sung et al.

(10) Patent No.: US 8,433,350 B2
(45) Date of Patent: *Apr. 30, 2013

(54) METHOD FOR CONTROLLING INTER-CELL INTERFERENCE IN A MOBILE COMMUNICATION SYSTEM

(75) Inventors: Dan Keun Sung, Daejeon (KR); Bang Chul Jung, Seoul (KR)

(73) Assignee: Pantech Co., Ltd., Seoul (KR)

( * ) Notice: Subject to any disclaimer, the term of this patent is extended or adjusted under 35 U.S.C. 154(b) by 34 days.

This patent is subject to a terminal disclaimer.

(21) Appl. No.: 13/012,753

(22) Filed: Jan. 24, 2011

(65) Prior Publication Data

US 2011/0116410 A1    May 19, 2011

Related U.S. Application Data

(63) Continuation of application No. 11/846,093, filed on Aug. 28, 2007, now Pat. No. 7,890,130.

(30) Foreign Application Priority Data

Aug. 30, 2006  (KR) .......................... 10-2006-0082992

(51) Int. Cl.
*H04B 15/00*   (2006.01)
*H04B 17/00*   (2006.01)

(52) U.S. Cl.
USPC .................. 455/501; 455/522; 455/67.13

(58) Field of Classification Search .............. 455/522, 455/63.1, 447, 422.1, 278.1, 296, 435.2, 455/438, 432.1, 67.11, 501, 67.13
See application file for complete search history.

(56) References Cited

U.S. PATENT DOCUMENTS

| | | |
|---|---|---|
| 6,230,023 B1 | 5/2001 | Slanina |
| 6,385,437 B1 | 5/2002 | Park et al. |
| 6,584,325 B1 | 6/2003 | Shakhgildian |
| 6,643,520 B1 | 11/2003 | Park et al. |
| 6,671,266 B1 | 12/2003 | Moon et al. |
| 6,708,041 B1 | 3/2004 | Butovitsch et al. |

(Continued)

FOREIGN PATENT DOCUMENTS

| | | |
|---|---|---|
| CN | 1636346 | 7/2005 |
| JP | 08-107382 | 4/1996 |

(Continued)

OTHER PUBLICATIONS

Notice of Allowance of U.S. Appl. No. 11/846,093 issued on Oct. 7, 2010.

(Continued)

*Primary Examiner* — Sonny Trinh
(74) *Attorney, Agent, or Firm* — H.C. Park & Associates, PLC

(57) ABSTRACT

A method for controlling inter-cell interference (ICI) in a mobile communication system by transmitting uplink control information from a base station in a home cell to a terminal of a neighboring cell based on ICI amount information measured at the base station. The ICI control method includes receiving an uplink signal at a base station and extracting inter-cell interference amount information from the uplink signal, generating uplink control information based on the extracted inter-cell interference amount information, and transmitting the uplink control information to a terminal in a neighboring cell. The terminal schedules an uplink resource including selecting frequency bands for an uplink signal by referring to the uplink control information.

24 Claims, 14 Drawing Sheets

U.S. PATENT DOCUMENTS

| | | |
|---|---|---|
| 6,794,858 B2 | 9/2004 | Ishii |
| 6,801,767 B1 | 10/2004 | Schwartz et al. |
| 6,813,479 B2 | 11/2004 | Voyer |
| 6,934,340 B1 | 8/2005 | Dollard |
| 7,366,507 B2 * | 4/2008 | Ammi et al. ............ 455/423 |
| 7,636,334 B2 * | 12/2009 | Gerlach ............ 370/330 |
| 7,668,564 B2 | 2/2010 | Onggosanusi et al. |
| 7,912,476 B2 * | 3/2011 | Kwon et al. ............ 455/452.2 |
| 7,974,652 B2 * | 7/2011 | Gerlach et al. ............ 455/522 |
| 8,126,403 B2 * | 2/2012 | Helmersson et al. ............ 455/63.1 |
| 8,140,019 B2 * | 3/2012 | Kim et al. ............ 455/63.1 |
| 8,145,223 B2 * | 3/2012 | Guey ............ 455/447 |
| 8,145,252 B2 * | 3/2012 | Sung et al. ............ 455/522 |
| 8,190,094 B2 * | 5/2012 | Kim et al. ............ 455/63.1 |
| 2001/0014612 A1 | 8/2001 | Uesugi |
| 2001/0017851 A1 | 8/2001 | Yamaguchi et al. |
| 2002/0001336 A1 | 1/2002 | Hosomi |
| 2002/0062472 A1 | 5/2002 | Medlock et al. |
| 2002/0077141 A1 | 6/2002 | Hwang et al. |
| 2002/0118724 A1 | 8/2002 | Kishimoto et al. |
| 2002/0145968 A1 | 10/2002 | Zhang et al. |
| 2003/0128658 A1 | 7/2003 | Walton et al. |
| 2004/0013101 A1 | 1/2004 | Akin et al. |
| 2004/0162100 A1 | 8/2004 | Moon et al. |
| 2004/0253962 A1 | 12/2004 | Ganti et al. |
| 2005/0286547 A1 | 12/2005 | Baum et al. |
| 2006/0030324 A1 | 2/2006 | Hsu et al. |
| 2006/0092875 A1 | 5/2006 | Yang et al. |
| 2006/0094363 A1 | 5/2006 | Kang et al. |
| 2006/0094372 A1 | 5/2006 | Ahn et al. |
| 2006/0121901 A1 | 6/2006 | Tanaka et al. |
| 2007/0046459 A1 | 3/2007 | Silverman et al. |

FOREIGN PATENT DOCUMENTS

| | | |
|---|---|---|
| JP | 11-155172 | 6/1999 |
| JP | 11-341555 | 12/1999 |
| JP | 2000-013310 | 1/2000 |
| JP | 2004-260467 | 9/2004 |
| JP | 2005-020566 | 1/2005 |
| JP | 2005-318327 | 11/2005 |
| WO | 2005/046274 | 5/2005 |
| WO | 2005/101882 | 10/2005 |
| WO | 2005/117283 | 12/2005 |
| WO | 2006/004968 | 1/2006 |
| WO | 2006/007318 | 1/2006 |

OTHER PUBLICATIONS

Non-Final Office Action of U.S. Appl. No. 11/846,093 issued on Apr. 19, 2010.
Final Office Action of U.S. Appl. No. 11/846,106 issued on Sep. 7, 2010.
Non-Final Office Action of U.S. Appl. No. 11/846,106 issued on Mar. 31, 2010.
Notice of Allowance of U.S. Appl. No. 11/846,106, dated Nov. 16, 2011.
Tse, et al. "Fundamentals of Wireless Communication" 2005. pp. 183-184, Cambridge University Press.
Non-Final Office Action of U.S. Appl. No. 11/846,106, dated Mar. 11, 2011.
Final Office Action of U.S. Appl. No. 11/846,106, dated Aug. 15, 2011.
First Office Action of Taiwanese Application No. 096131797 dated May 21, 2012.
Extended European Search Report dated Dec. 6, 2012 issued for European Patent Application No. 07253398.7.

* cited by examiner

METHOD FOR CONTROLLING INTER-CELL INTERFERENCE IN A MOBILE COMMUNICATION SYSTEM

CROSS REFERENCE TO RELATED APPLICATIONS

This application is a continuation of U.S. patent application Ser. No. 11/846,093, filed on Aug. 28, 2007, and claims priority from and the benefit of Korean Patent Application No. 10-2006-0082992, filed on Aug. 30, 2006, all of which are hereby incorporated by reference for all purposes as if fully set forth herein.

BACKGROUND OF THE INVENTION

1. Field of the Invention

The present invention relates to inter-cell interference (ICI) in a mobile communication system, and more particularly, to a method for controlling ICI by transmitting uplink control information to a terminal of a neighboring cell based on ICI amount information measured at a base station, and a mobile communication system employing the method.

2. Discussion of the Background

Mobile communication technology includes a communication device useable by a user in a moving object, such as a train, a ship, or an airplane, or while the user is walking.

FIG. 1 illustrates a cell structure of a mobile communication system in which a mobile communication device may be used according to the conventional art. As shown in FIG. 1, a mobile communication system includes base stations 111, 112, and 113, and mobile communication devices, which may be referred to as mobile stations or a mobile communication terminals (hereinafter, referred to individually as "terminal") 121, 122, and 123. Each base station 111, 112, and 113 provides mobile communication services to a respective wireless communication area, called a "cell". Each terminal 121, 122, and 123 may be located in a cell corresponding to one of the base stations 111, 112, and 113, and respectively receives mobile communication service via the base stations 111, 112, and 113.

In this instance, a base station 111, 112, or 113 in a cell may be affected by multiple access interference corresponding to signal interference from a terminal located within the cell, and inter-cell interference (ICI) corresponding to signal interference from a terminal located in a neighboring cell.

Orthogonal frequency division multiplexing (OFDM) technology has been developed, and may be able to reduce multiple access interference. However, ICI, and in particular, ICI of an uplink channel has not been solved through the use of OFDM.

In many mobile communication systems, a terminal near a cell boundary may have signal distortion due to the ICI. Accordingly, for secure data transmission, channel coding is performed with an extremely low channel coding rate and then data is transmitted. For example, a portable internet Wireless Broadband (WiBro) standard uses a coding rate of $1/12$.

Various solutions have been proposed for reducing ICI problem. FIG. 2 illustrates an example of a frequency band allocation method based on fractional frequency reuse (FFR) according to the conventional art.

Referring to FIG. 2, terminals located in the centers of a cell (1) 221 (cell 221), a cell (2) 222 (cell 222), and a cell (3) 223 (cell 223) use the same frequency band (210). However, a terminal near a cell boundary may not use one predetermined frequency band from among three frequency bands 211, 212, and 213, or may use the predetermined frequency band at a lower power to avoid frequency duplication with a neighboring cell. For example, a terminal near a boundary of cell 221 may not use a first fractional bandwidth 211 or may use the first fractional bandwidth 211 with a lower power. Also, another terminal near a boundary of cell 222 may not use a second fractional bandwidth 212 or may use the second fractional bandwidth 212 with a lower power. Also, still another terminal near a boundary of cell 223 may not use a third fractional bandwidth 213 or may use the third fractional bandwidth 213 with a lower power. As a result, the terminal may reduce ICI, but a frequency reuse factor for a terminal located in an outer boundary of a cell is reduced to $2/3$ without regard for the actual use of the three frequency bands prior to avoiding frequency duplication with a neighboring cell.

FIG. 3 illustrates another frequency band allocation method for ICI reduction according to the conventional art. Referring to FIG. 3, a cell is divided into a central area (a white area) and an outer area (a shaded area). In this instance, frequency bands are allocated so that a mobile terminal of the central area may use a common frequency band with neighboring cells, and a terminal of the outer area may use a frequency band that is not used in neighboring cells.

Specifically, a cell (2) 302 (cell 302), a cell (3) 303 (cell 303), a cell (4) 304 (cell 304), a cell (5) 305 (cell 305), a cell (6) 306 (cell 306), and a cell (7) 307 (cell 307) neighbor a cell (1) 301 (cell 301). A first frequency band is allocated to an outer boundary of the cell 301 and is marked in black, but is not duplicated with a second frequency band and a third frequency band allocated to outer boundaries of the cells 302, 303, 304, 305, 306, and 307. Also, the cells 302, 304, and 306, which are allocated with the second frequency band and have outer boundaries marked in dots, are spaced apart from each other. Also, the cells 303, 305, and 307, which are allocated with the third frequency band and have outer boundaries marked in diagonal lines, are spaced apart from each other. Specifically, the ICI reduction scheme shown in FIG. 3 may allocate a frequency band that is not used by neighboring cells in an outer boundary with more severe ICI, thereby reducing the ICI.

In addition to the ICI reduction schemes described with reference to FIG. 2 and FIG. 3, various types of ICI reduction schemes have been proposed. The ICI reduction schemes are commonly based on an idea of ICI coordination and avoidance that limits frequency use time or frequency resources for a terminal located in an outer boundary of a cell.

However, the ICI reduction schemes based on ICI coordination and avoidance, including the FFR scheme, have many problems.

First, in practice, a cell area may have a significantly distorted shape that is different than a theoretical hexagonal cell arrangement. Accordingly, it may be more difficult to define the outer boundary and then separately manage frequency bands for the central area and the outer boundary.

Second, since an available frequency band is reduced, trunking efficiency may be reduced. Specifically, wireless resources may be exhausted when more terminals are located in the outer boundary of the cell.

Third, in comparison to when the same entire frequency band is used in all cells, frequency hopping may be reduced. Accordingly, frequency diversity effect may be reduced, and thus a multi-path signal may not be effectively processed.

Fourth, since a frequency band is allocated to a terminal located in an outer boundary of a cell based on a relation with a neighboring cell, flexible cell planning may be difficult. For example, when adding an additional base station and an additional cell between existing cells, a new frequency band should be allocated to cells adjacent to the additional cell, and this may require the modification of the cell planning.

Fifth, a portion of the frequency band may be unused even if there is no ICI. Accordingly, wireless resources may not be effectively managed.

Finally, in the conventional ICI reduction schemes as described above, an upper layer service control point (SCP) or a mobile switching center (MSC) should be in charge of cell planning and coordination for the base stations. However, this is inconsistent with ALL-Internet Protocol (IP), which is the trend for the next generation communication network.

Accordingly, there is a need for a new technology to control uplink resources of a terminal based on ICI amount information measured at a base station.

SUMMARY OF THE INVENTION

This invention provides a method for controlling uplink resources in a mobile communication terminal, based on inter-cell interference (ICI) amount information measured at a base station.

Additional features of the invention will be set forth in the description which follows, and in part will be apparent from the description, or may be learned by practice of the invention.

The present invention discloses a method for controlling ICI in a mobile communication system. The method includes receiving a first uplink signal at a base station, extracting inter-cell interference amount information from the first uplink signal, generating uplink control information based on the inter-cell interference amount information, and transmitting the uplink control information to a mobile communication terminal. Further, the mobile communication terminal generates a second uplink signal by referring to the uplink control information.

The present invention also discloses a method for scheduling uplink resources. The method includes receiving uplink control information, the uplink control information including an inter-cell interference amount measured at the base station, and determining a transmission signal power for each frequency band of an uplink signal by referring to the uplink control information.

The present invention also discloses a mobile communication system including a first base station to provide wireless communication services to a first cell, and a mobile communication terminal arranged in a second cell neighboring the first cell. The first base station includes an inter-cell interference amount information extractor to extract inter-cell interference amount information from a first uplink signal received via an antenna, and a control information generator to generate first uplink control information based on the inter-cell interference amount information. Further, the mobile communication terminal includes a control information receiver to receive the first uplink control information from the first base station, and a transmission signal power control unit to determine an uplink transmission signal power based on the first uplink control information.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
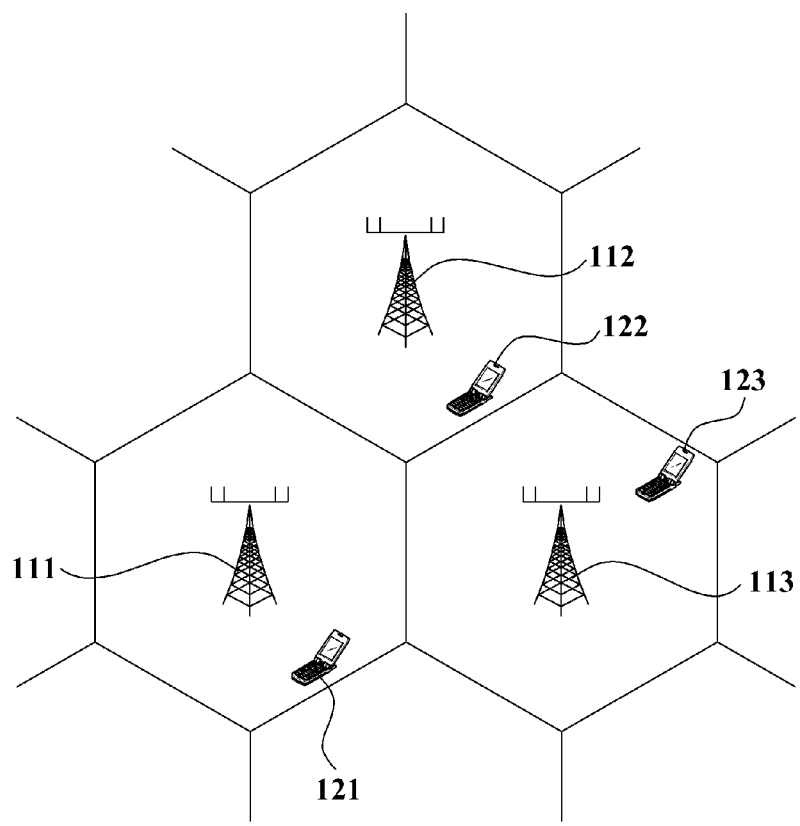
FIG. 1 illustrates a cell structure of a mobile communication system according to the conventional art.
Figure 2:
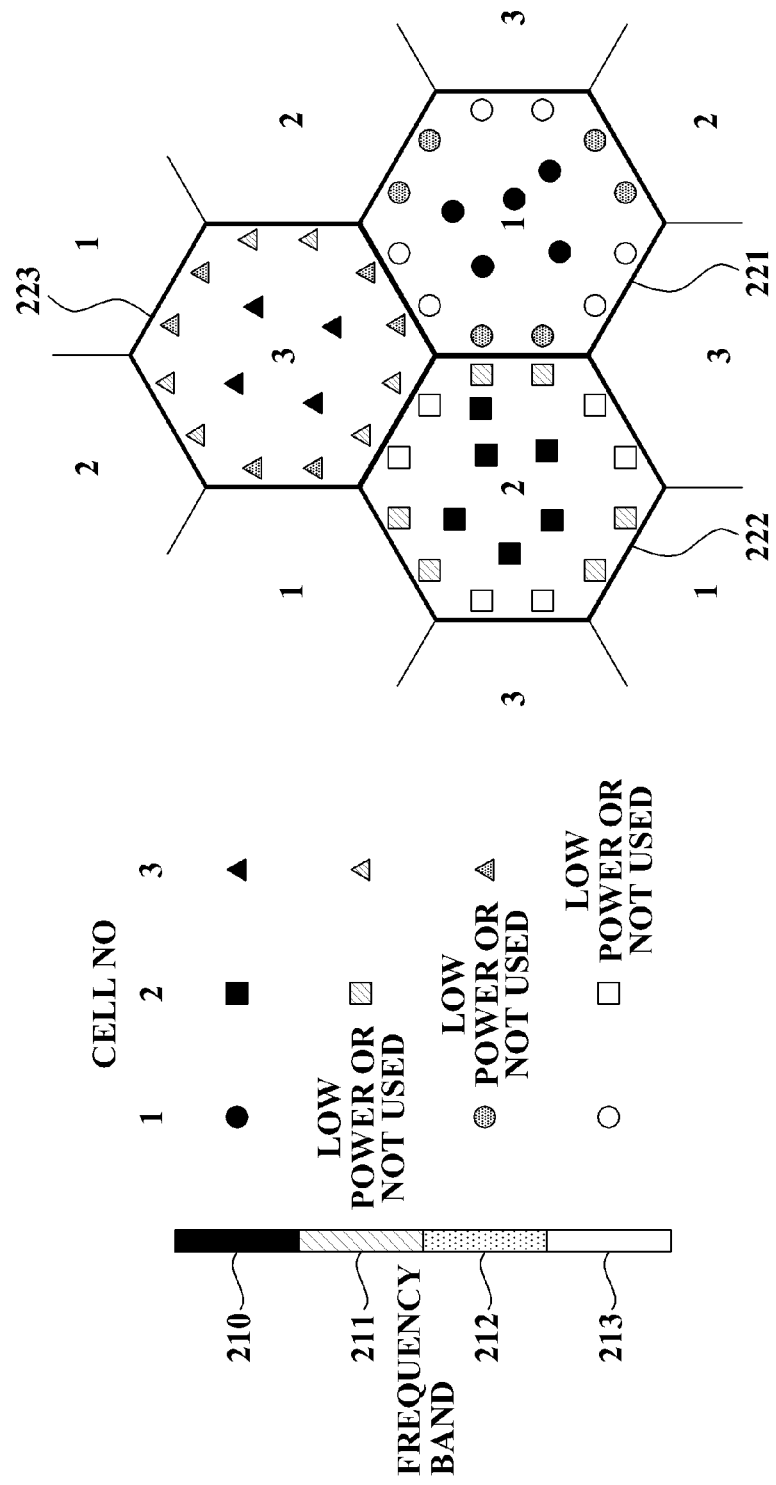
FIG. 2 illustrates an example of a frequency band allocation method based on fractional frequency reuse (FFR) according to the conventional art.
Figure 3:
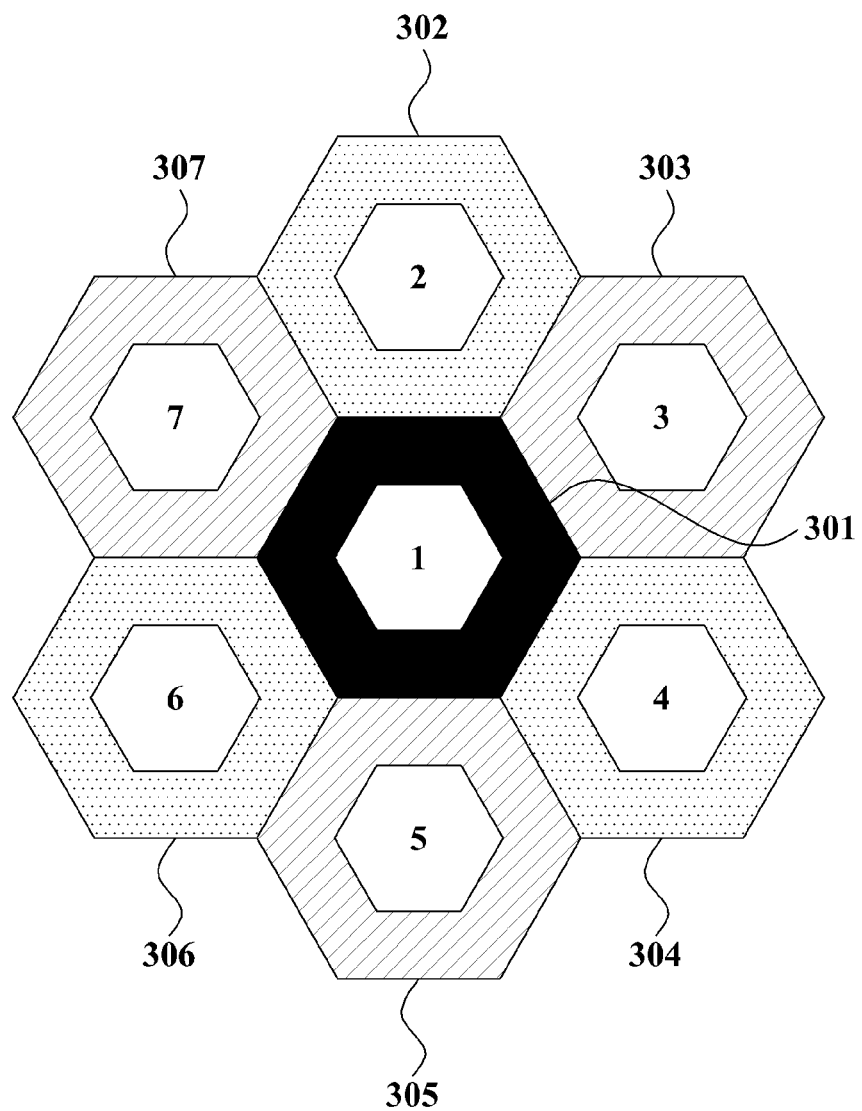
FIG. 3 illustrates another example of a frequency band allocation method according to the conventional art.

The invention is described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure is thorough, and will fully convey the scope of the invention to those skilled in the art. In the drawings, the size and relative sizes of layers and regions may be exaggerated for clarity Like reference numerals in the drawings denote like elements.

It will be understood that when an element is referred to as being "connected to" another element, it can be directly connected to the other element or intervening elements may also be present. In contrast, when an element is referred to as being "directly connected to" another element, there are no intervening elements present.

Reference will now be made in detail to exemplary embodiments of the present invention as shown in the accompanying drawings.

Figure 4:
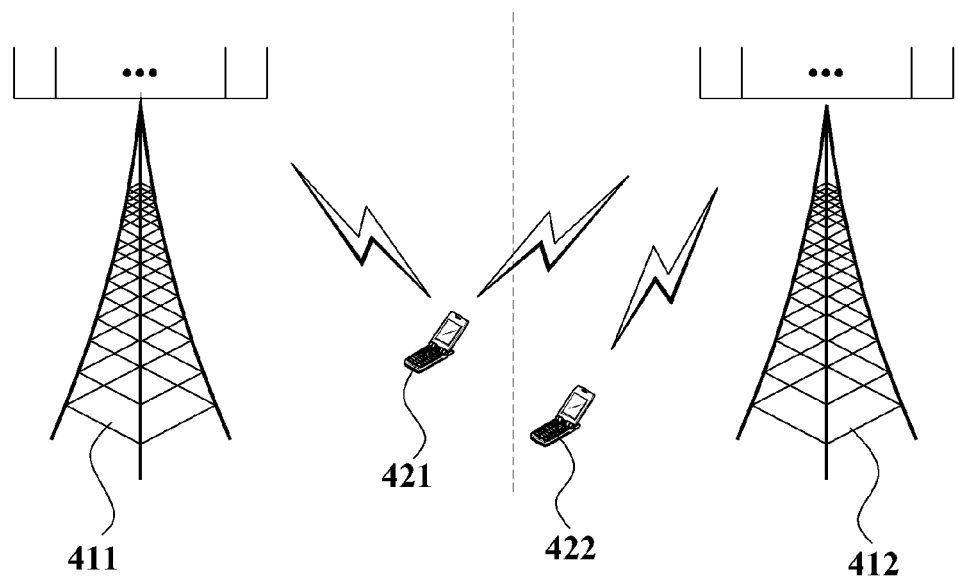
FIG. 4 illustrates a method for transmitting and receiving a signal between a terminal located in a first cell and a base station of a neighboring cell in a mobile communication system according to an exemplary embodiment of the present invention.

FIG. 4 illustrates a method for transmitting and receiving a signal between a terminal located in a first cell and a base station of a neighboring cell in a mobile communication system according to an exemplary embodiment of the present invention.

Referring to FIG. 4, a first terminal 421 transmits and receives data with a first base station 411 belonging to a first cell, and a second terminal 422 transmits and receives data with a second base station 412 belonging to a second cell. If the first terminal 421 is located in the first cell and transmits data to the first base station 411 via an uplink channel, ICI may occur in a signal transmitted between the second terminal 422 in the second cell and the second base station 412.

According to the present exemplary embodiment, the second base station 412 extracts ICI amount information, and transmits the extracted ICI amount information to the first terminal 421 of the first cell so that the first terminal 421 may control the uplink transmission signal power. In this instance, the second base station 412 may extract ICI amount information from an uplink signal received from the first terminal 421 of the first cell or the second terminal 422 of the second cell.

The term "ICI amount information" used throughout the present specification indicates information representing or including various types of measured values indicating a degree of ICI caused by a signal from the first terminal 421 of the first cell and affecting uplink data transmission in the second cell. Also, the ICI amount information may include various types of values measured at the first base station 412. According to exemplary embodiments, the ICI amount information may include signal strength of a signal received in a particular frequency band or a particular time slot, or signal strength of a signal received across the entire applicable frequency band or the entire time slot.

The ICI amount information may be measured from the received signal strength of the uplink signal. In this instance, greater received signal strength may indicate a greater amount of ICI. Accordingly, when the measured received signal strength is greater than a predetermined threshold value, the second base station 412 may transmit uplink control information indicating a decrease in an uplink transmission signal power or a restriction on a use of a corresponding frequency band to the first terminal 421 of the first cell. Then, the first terminal 421 controls the uplink transmission signal power by referring to the received uplink control information.

According to an exemplary embodiment of the present invention, the first terminal 421 receives a pilot signal via a downlink channel from the second base station 412, measures a channel response of each frequency band from the received pilot signal, and determines the uplink transmission signal power by referring to the uplink control information and the channel response of each frequency band.

Accordingly, the present exemplary embodiment may be applicable to systems that may measure a downlink channel response and estimate an uplink channel response from the downlink channel response. A representative example of the mobile communication system includes an orthogonal frequency division multiplexing (OFDM) system based on a Time Division Duplexing (TDD) scheme. The present invention may also be applicable in various systems, such as a wireless local area network (WLAN), a TDD mode of a next generation mobile communication system, which is being currently discussed in a $3^{rd}$ Generation Partnership Project Long Term Evolution (3GPP LTE) specification, a Wireless Broadband (WiBro) system, or WiBro Evolution.

However, the present invention is not limited thereto. Specifically, the present invention may be widely applicable to systems that can measure a downlink channel response and estimate an uplink channel response. Thus, the present invention may be applicable to any types of mobile communication systems in which the downlink channel response and the uplink channel response have a certain correlation therebetween, and thus the correlation may be known in advance or measured.

Hereinafter, exemplary embodiments of the present invention will be described for a mobile communication system based on an OFDM system based on a TDD scheme, which is for convenience of description only, and the present invention is not limited thereto. In this case, the downlink channel response and the uplink channel response between the first terminal 421 and the second base station 412 of the second cell are identical so the correlation between downlink channel response and uplink channel response is known.

Figure 5A:
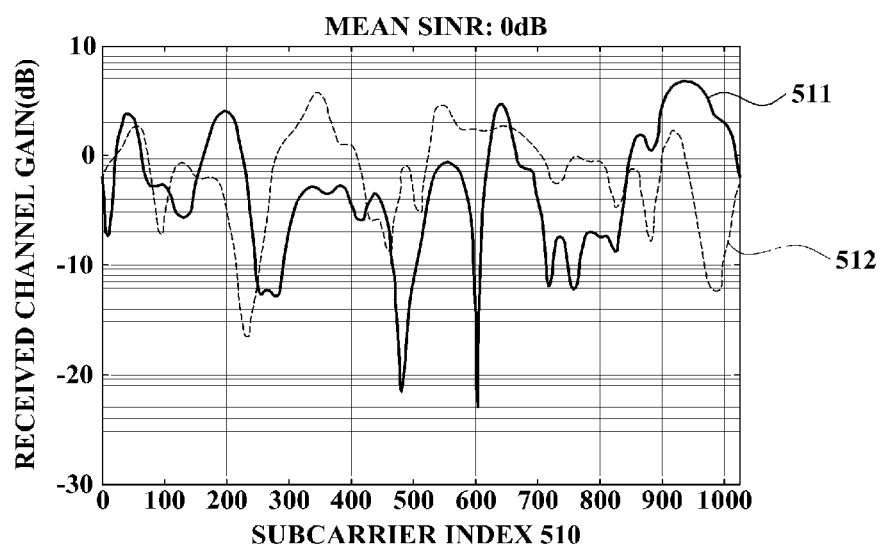
FIG. 5A is a graph illustrating the channel gain of a channel signal received from a base station of a home cell and a channel signal received from a neighboring cell measured by a terminal according to an exemplary embodiment of the present invention.
Figure 5B:
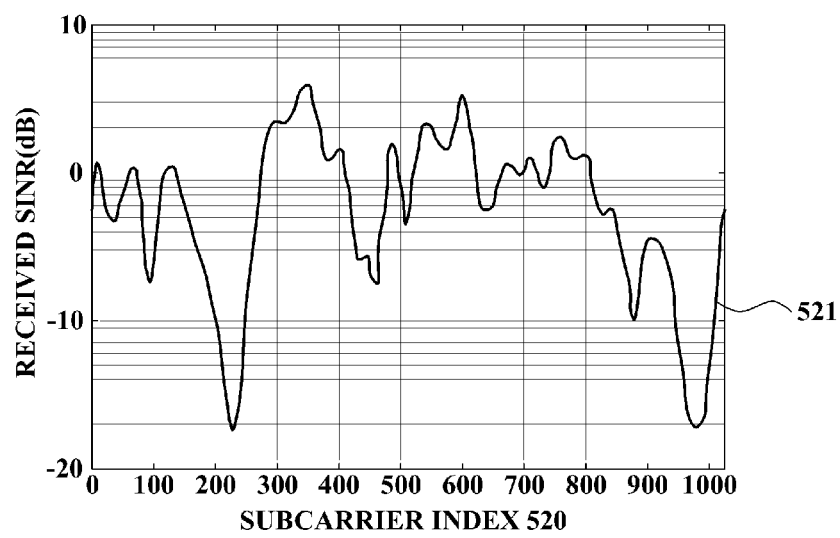
FIG. 5B is a graph illustrating a Signal-to-Interference plus Noise Ratio (SINR) based on the measured signal strength of the channel signal received from a base station of a home cell and the measured signal strength of the channel signal received from a neighboring cell according to an exemplary embodiment of the present invention.

FIG. 5A is a graph illustrating the channel gain of a channel signal received from a base station of a home cell and a channel signal received from a neighboring cell measured by a terminal according to an exemplary embodiment of the present invention. FIG. 5B is a graph illustrating a Signal-to-Interference plus Noise Ratio (SINR) based on the measured signal strength of the channel signal received from a base station of a home cell and the measured signal strength of the channel signal received from a neighboring cell according to an exemplary embodiment of the present invention.

More specifically, FIG. 5A and FIG. 5B are graphs illustrating a downlink channel response, which may be measured by using a pilot signal received by the first terminal 421 of FIG. 4 and the second terminal 422 from the second base station 412. The graph 510 and the graph 520 of FIG. 5A and FIG. 5B, respectively, show the downlink channel response measured for various frequency bands.

Referring to FIG. 5A, a received channel gain 511 of the downlink channel measured by the first terminal 421 is indicated by a solid line. A received channel gain 512 of the downlink channel measured by the second terminal 422 is indicated by a dotted line. If the uplink channel response is identical to the downlink channel response as described above, the downlink channel response shown in the graph 510 also indicates an uplink channel response of an uplink channel in which data is transmitted from the first terminal 421 and the second terminal 422 to the second base station 412.

Thus, if the first terminal 421 and the second terminal 422 each transmit a signal to the second base station 412 via the uplink channel with the above-described channel response, the second base station 412 identifies the signal transmitted from the first terminal 421 as noise. Accordingly, when disregarding effects of thermal noise, a signal-to-interference plus noise ratio (SINR) 521, as shown by a black line of the graph 520 of FIG. 5B, corresponds to a difference between gain of a transmission channel 512 and gain of an interference 511 in the second base station 412.

Referring to FIG. 5B, due to the interference 511 from the first terminal 421 of the neighboring cell, the uplink channel response fluctuates very widely for each frequency band. Particularly, SINR in a frequency band is very low if the gain of the transmission channel 512 is comparatively smaller and the gain of the interference 511 is comparatively greater.

Specifically, if the first terminal 421 uses a frequency band with a good uplink channel response to the second base station 412 of the second cell, ICI may result. Therefore, exemplary embodiments of the present invention disclose a method in which the first terminal 421 also measures a downlink channel response associated with the second base station 412 of the second cell for each frequency band by using a pilot signal received from the second base station 412, and does not use a frequency band with a good channel response. Thereby, the first terminal 421 may reduce ICI to the second base station 412 of the second cell.

In the present exemplary embodiment, the pilot signal is used as an example of a signal that the first terminal 421 receives from the second base station 412 of the second cell in order to measure the downlink channel response. More specifically, the first terminal 421 may receive a common pilot channel signal corresponding to a common pilot signal between neighboring cells. However, a received signal may include any type of signal that can be used to measure the downlink channel response.

Also, the channel response for each frequency band may be measured as channel gain of the received signal, signal strength thereof, or received signal power thereof. However, according to the present exemplary embodiment, the channel response for each frequency band may include the above-described specific examples, and also may include various types of indices that may be measured in a numerical value and thus comparable.

Figure 6A:
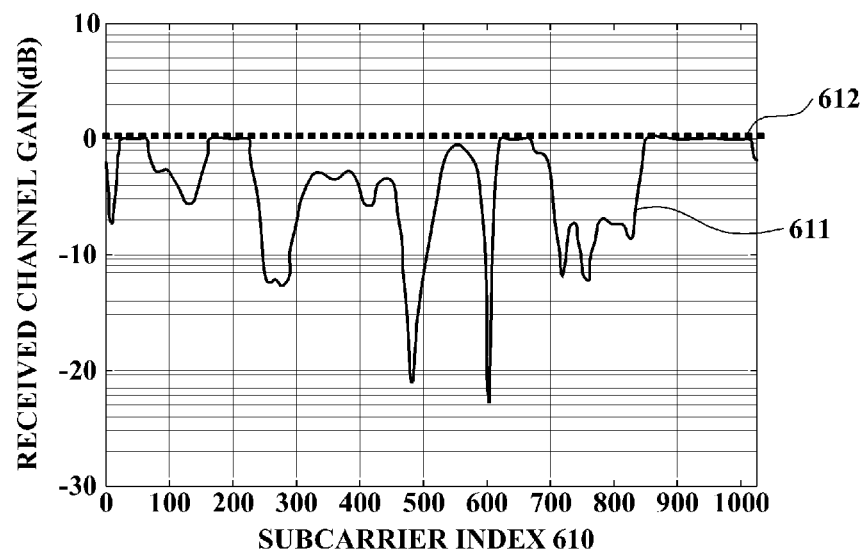
FIG. 6A and FIG. 6B are graphs illustrating the effect on a transmission channel when a portion of a frequency band is not used based on the signal strength of a channel signal received from a base station of a neighboring cell according to an exemplary embodiment of the present invention.
Figure 6B:
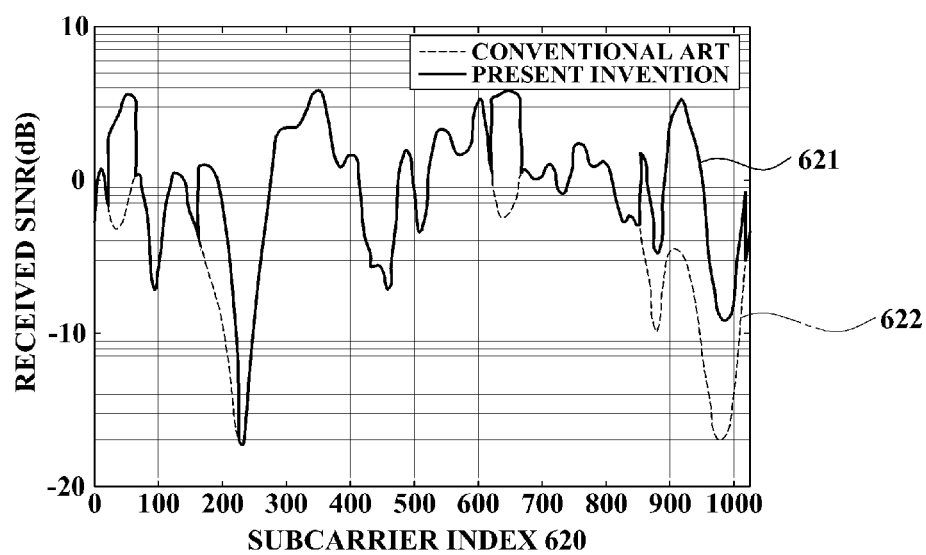

FIG. 6A and FIG. 6B are graphs illustrating the effect on a transmission channel when a portion of a frequency band is not used based on the signal strength of a channel signal received from a base station of a neighboring cell according to an exemplary embodiment of the present invention.

More specifically, FIG. 6A and FIG. 6B are graphs illustrating a change in uplink SINR of the second base station 412 of FIG. 4 when the first terminal 421 does not use a frequency band with a good channel response for an uplink channel.

Referring to FIG. 6A, a graph 610 shows a method for nullifying a corresponding frequency band when gain of a downlink channel 611 is greater than a threshold value 612. In this exemplary embodiment, the threshold value may be uniform, such as 0 db, for the entire applicable frequency band. Accordingly, as shown in the graph 610, frequency bands corresponding to subcarrier index values from 20 to 60, from 170 to 230, from 620 to 670, and from 850 to 1000 have a received channel gain of approximately 0 dB and therefore are not used for uplink data transmission. Graph 610 corresponds to channel gain 511 shown in FIG. 5A except that those frequency bands having a received channel gain greater than the threshold value of 0 dB have been nullified or adjusted down to the threshold value of 0 dB.

Referring to FIG. 6B, a graph 620 shows how an uplink channel response is improved in the second base station 412 of the second cell when the frequency band with the good downlink channel is nullified. In this instance, a portion 622, indicated by a dotted line in the graph 620, indicates the uplink SINR 521 shown in the graph 520 of FIG. 5B, where channel gain 511 was not corrected for those frequency bands that exceeded 0 dB. Also, another portion 621, indicated by a solid line, indicates an improved uplink SINR when the particular frequency band is nullified in graph 610 as shown in FIG. 6A according to an exemplary embodiment of the present invention. As shown in FIG. 6B, the SINR is significantly improved in the corresponding frequency bands. Specifically, the significant ICI may be reduced by measuring the downlink channel response associated with the second base station 412 of the second cell, and excluding the frequency band with the good channel response from the uplink channel.

In a multi-path fading environment, a channel response difference for each frequency band changes over time. So that many base stations may measure information about an uplink channel response from a particular terminal and share the measured information, an upper layer service control point (SCP) or mobile switching center (MSC) may be used. However, since an upper layer system such as the SCP or the MSC may not be included in an ALL-Internet Protocol (IP) communication network structure according to a next generation communication network, a terminal may measure the downlink channel response in the present exemplary embodiment.

Also, when considering the physical distance between base stations and terminals, scheduling uplink channel resources from each terminal in real time may take time while various base stations share information about an uplink channel response associated with each terminal without the SCP or the MSC.

Accordingly, each terminal may measure a downlink channel response associated with a base station of a neighboring cell, and directly schedule an uplink channel resource based on the measured downlink channel response with the assumption that the downlink channel response and the uplink channel response have a certain correlation therebetween. Also, more effective scheduling is enabled in the terminal since the base station, which may be affected by ICI, measures ICI and transmits associated ICI control information to a terminal of neighboring cells.

Also, the above-described conventional ICI reduction methods allocate a fixed frequency band to be used in an outer boundary of each cell and thereby reflect only long-term fading characteristics. However, short-term fading characteristics may change over time for each frequency band. The exemplary embodiments of the present invention consider short-term fading characteristics, and may control ICI more effectively.

An ICI control method has been described above with reference to FIG. 4, FIG. 5, and FIG. 6. As described above, a base station extracts ICI amount information from an uplink signal received from a terminal, and transmits uplink control information based on the extracted ICI amount information to a terminal of a neighboring cell as a pilot signal. The terminal receives a pilot signal from the base station, measures a channel response for each frequency band based on the pilot signal, and determines an uplink transmission signal power by referring to the uplink control information received from the base station and the channel response measured by the terminal.

However, the present invention is not limited thereto. Specifically, in addition to the above-described exemplary embodiment, the present invention may be applicable to various types of schemes that can generate uplink control information based on ICI amount information extracted at a base station, transmit the uplink control information to a terminal of a neighboring cell, and thereby control ICI caused by the terminal.

In this instance, the ICI amount information may include a signal strength measurement value of a signal that is received by a resource unassociated with uplink data transmission in a home cell of the base station, such as a terminal located in a cell other than the home cell.

Specifically, when there is no interference and noise in a mobile communication system that transmits and receives data via frequency bands, notwithstanding a frequency band used for uplink data transmission in a home cell, a received signal of remaining frequency bands theoretically has zero energy.

After a sufficiently long time, when thermal noise is a signal with a mean value of 0 dB, an ICI amount from another cell may be measured as signal strength in frequency bands other than those frequency band allocated for data transmission in the home cell.

Also, for a mobile communication system that transmits and receives data by using many time slots, it is possible to measure an ICI amount by using a signal strength measured in time slots other than those time slots used for data transmission in the home cell. Also, in this case, the ICI amount may be measured for each frame representing a data transmission unit including the time slots.

Thus, according to the present exemplary embodiment, when a signal strength measurement value of a signal received via a resource unassociated with a home cell is greater than a predetermined threshold value, uplink control information may be generated by a base station and then transmitted to a terminal. In this instance, the uplink control information indicates a decrease in uplink transmission signal power allocated to a corresponding frequency band, or indicates non-use of the corresponding frequency band.

According to another exemplary embodiment of the present invention, ICI amount information measured at a base station may include a received signal strength measured with respect to the entire applicable frequency bands, or the entire uplink resources. In this instance, the entire uplink resources include both an uplink resource associated with a home cell and an uplink resource associated with a neighboring cell.

When the signal strength measurement value is greater than a predetermined threshold value, the base station may transmit uplink control information indicating a decrease in an uplink transmission signal power to a terminal. The terminal receives the uplink control information indicating the decrease in the uplink transmission signal power and may decrease the uplink transmission signal power with respect to the entire applicable frequency band to a predetermined level or may decrease the uplink transmission signal power with respect to a predetermined ratio of frequency bands randomly selected from among the applicable frequency bands. In this instance, the predetermined level and the predetermined ratio may be determined by the terminal based on the uplink control information. Accordingly, the uplink control information may include single-bit information for one or more frequency bands indicating whether to decrease the uplink transmission signal power of the terminal, and may further include specific numerical value information associated with the measured ICI amount.

Also, the ICI amount information may further include change information of the signal strength measurement value over time. In this instance, the term "change" may include both change trend, rate, and/or magnitude. Accordingly, if the signal strength measurement value significantly changes or an accumulated change is greater than a predetermined threshold value, or if a unidirectional change trend is observed for at least some minimum amount of time, the base station may command a terminal of a neighboring cell to decrease the uplink transmission signal power. As described above, the command is transmitted to the terminal in a form of uplink control information.

Different methods of controlling ICI are disclosed in the U.S. application Ser. No. 11/846,106, filed on Aug. 28, 2007, which is assigned to the same assignee of the present application.

Figure 7:
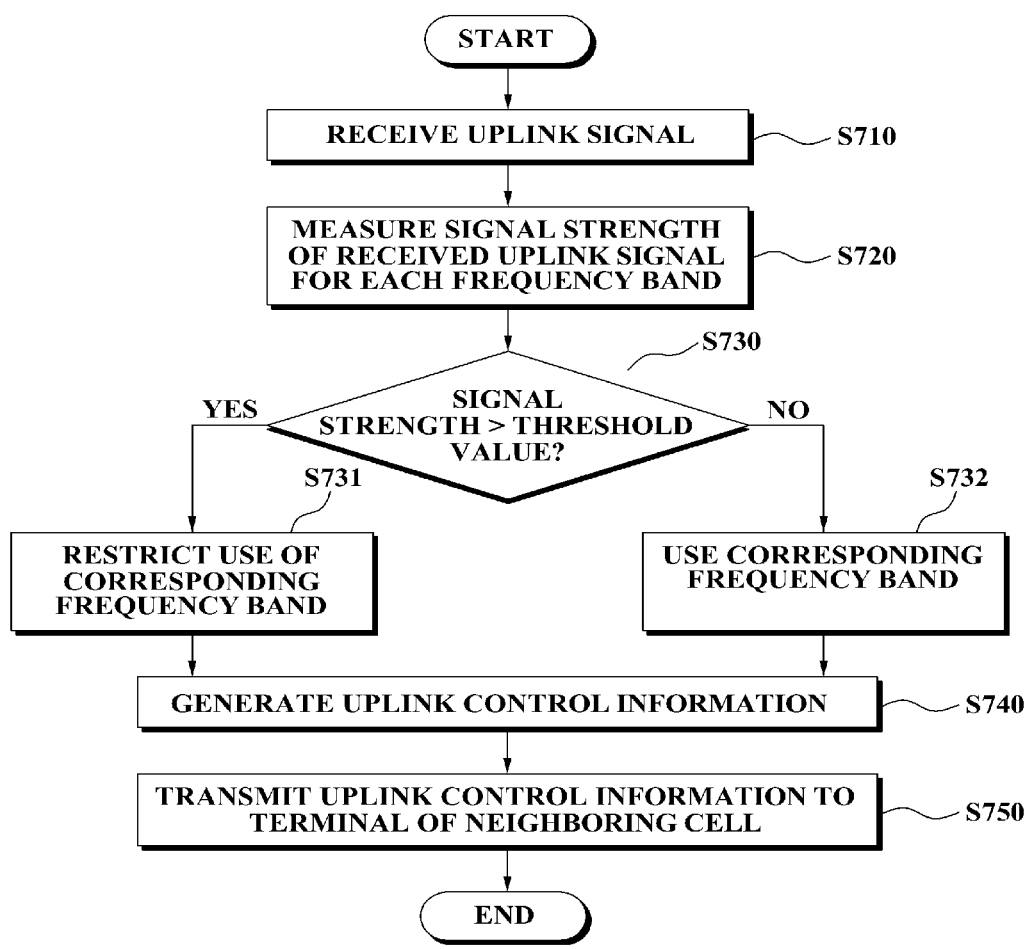
FIG. 7 is a flowchart illustrating a method for controlling ICI according to an exemplary embodiment of the present invention.
Figure 8:
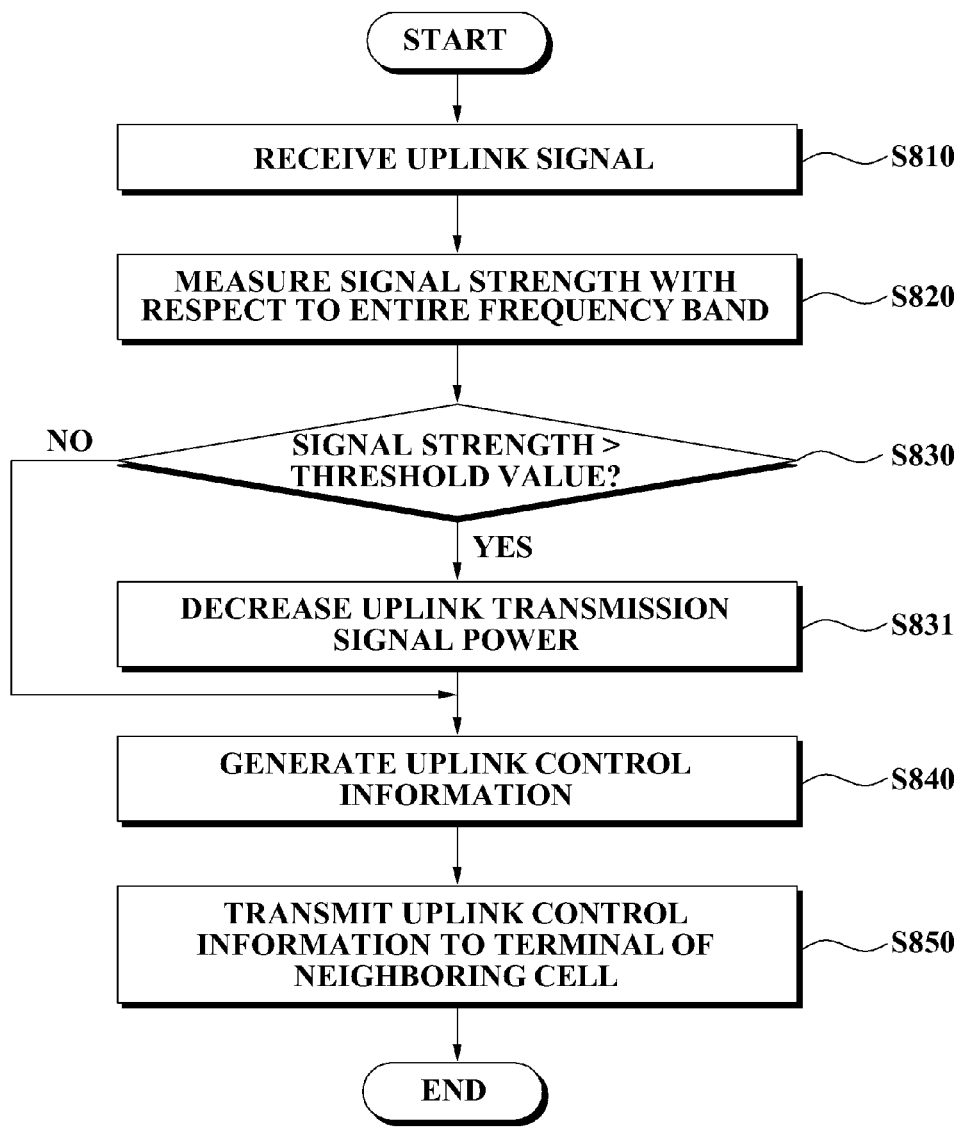
FIG. 8 is a flowchart illustrating a method for controlling ICI according to another exemplary embodiment of the present invention.
Figure 9:
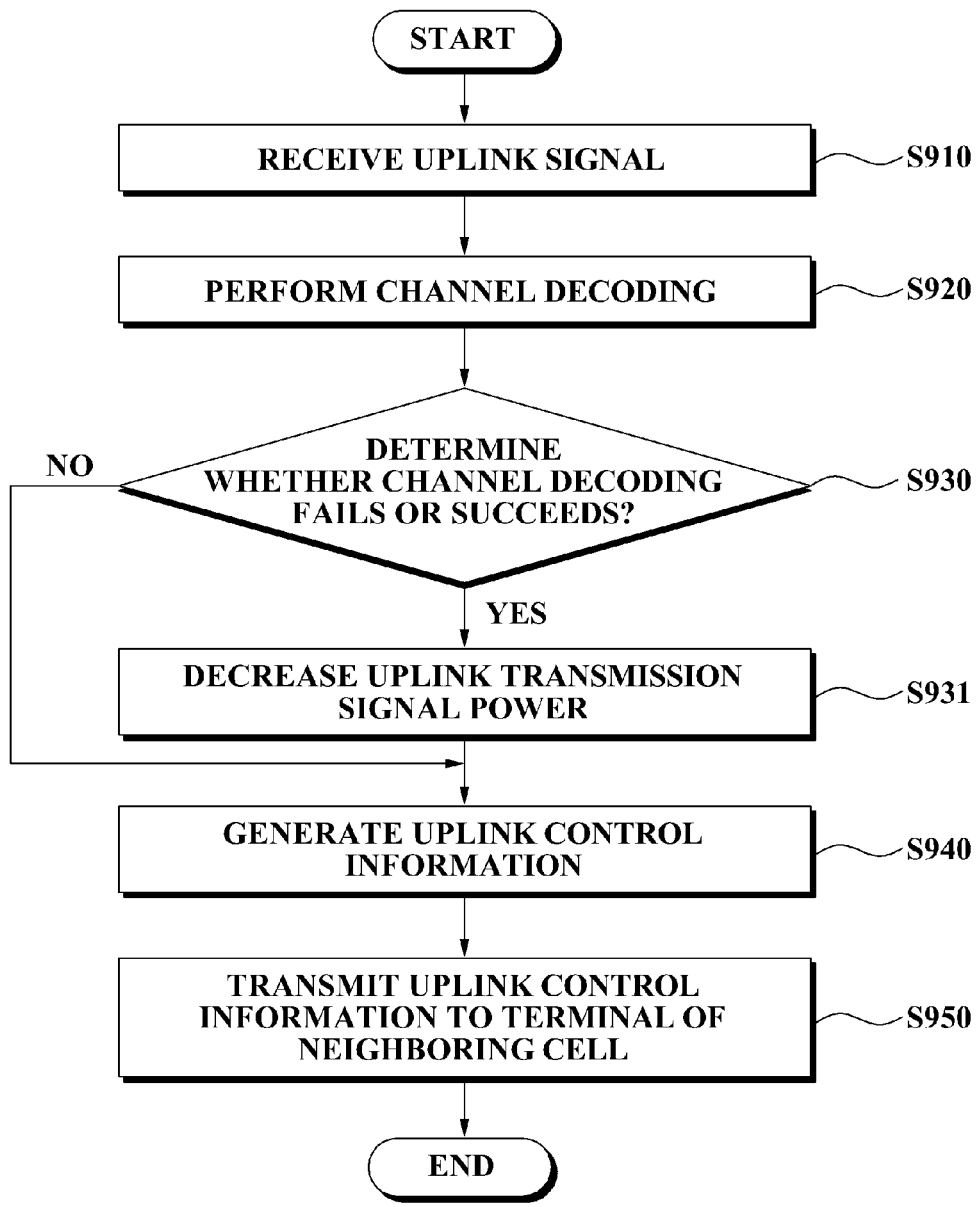
FIG. 9 is a flowchart illustrating a method for controlling ICI according to another exemplary embodiment of the present invention.
Figure 10:
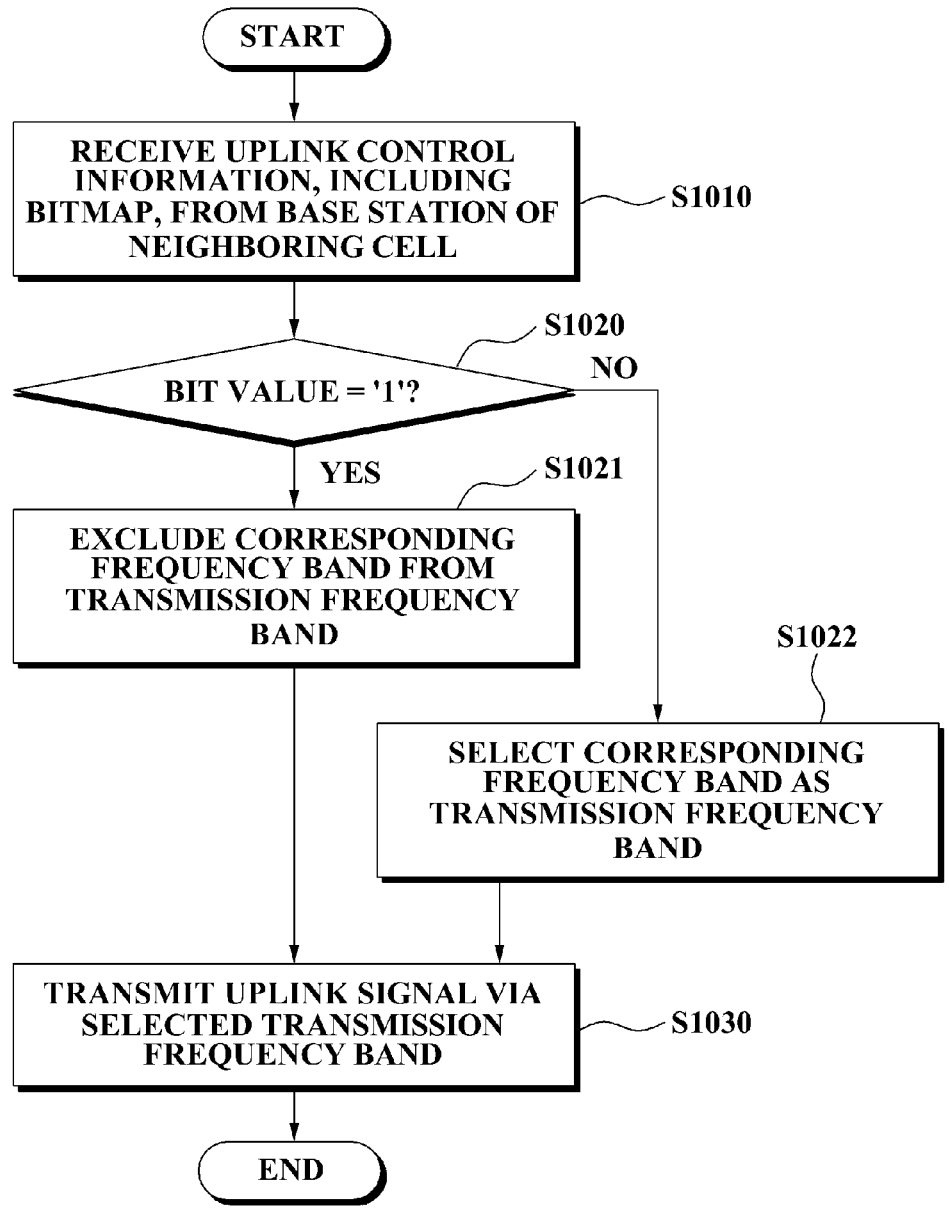
FIG. 10 is a flowchart illustrating a method for scheduling uplink resources according to an exemplary embodiment of the present invention.
Figure 11:
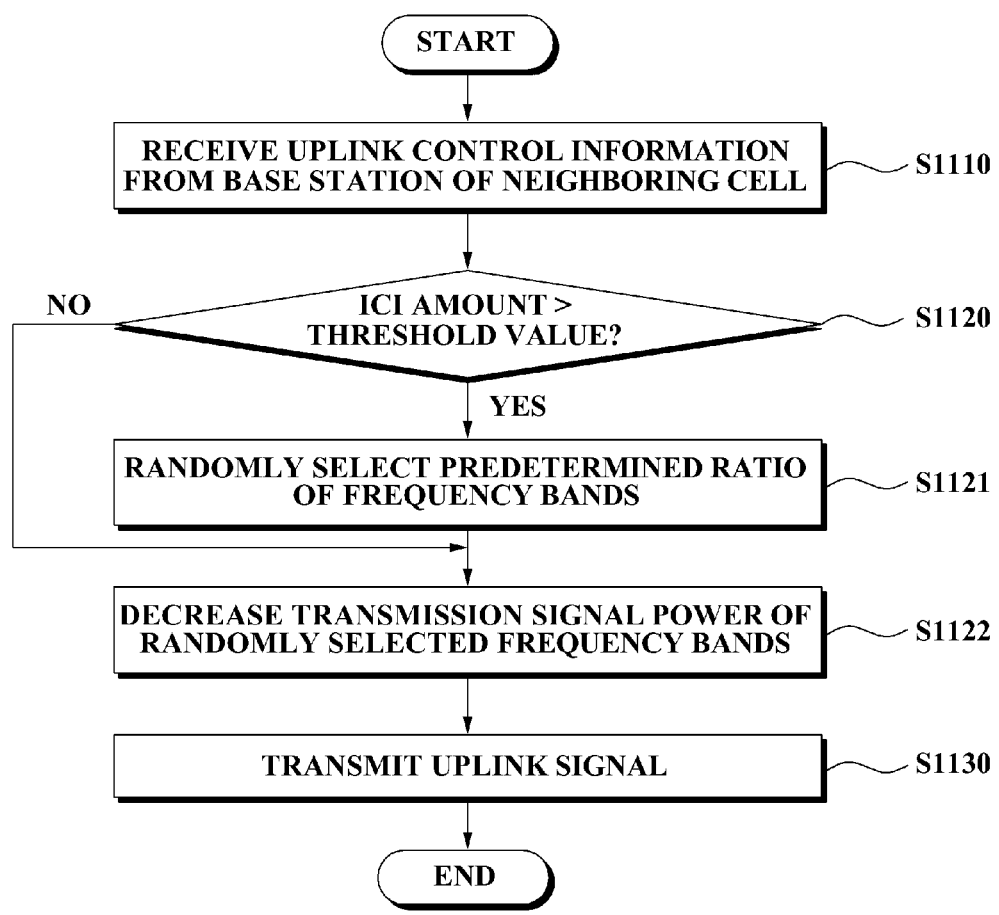
FIG. 11 is a flowchart illustrating a method for scheduling uplink resources according to another exemplary embodiment of the present invention.
Figure 12:
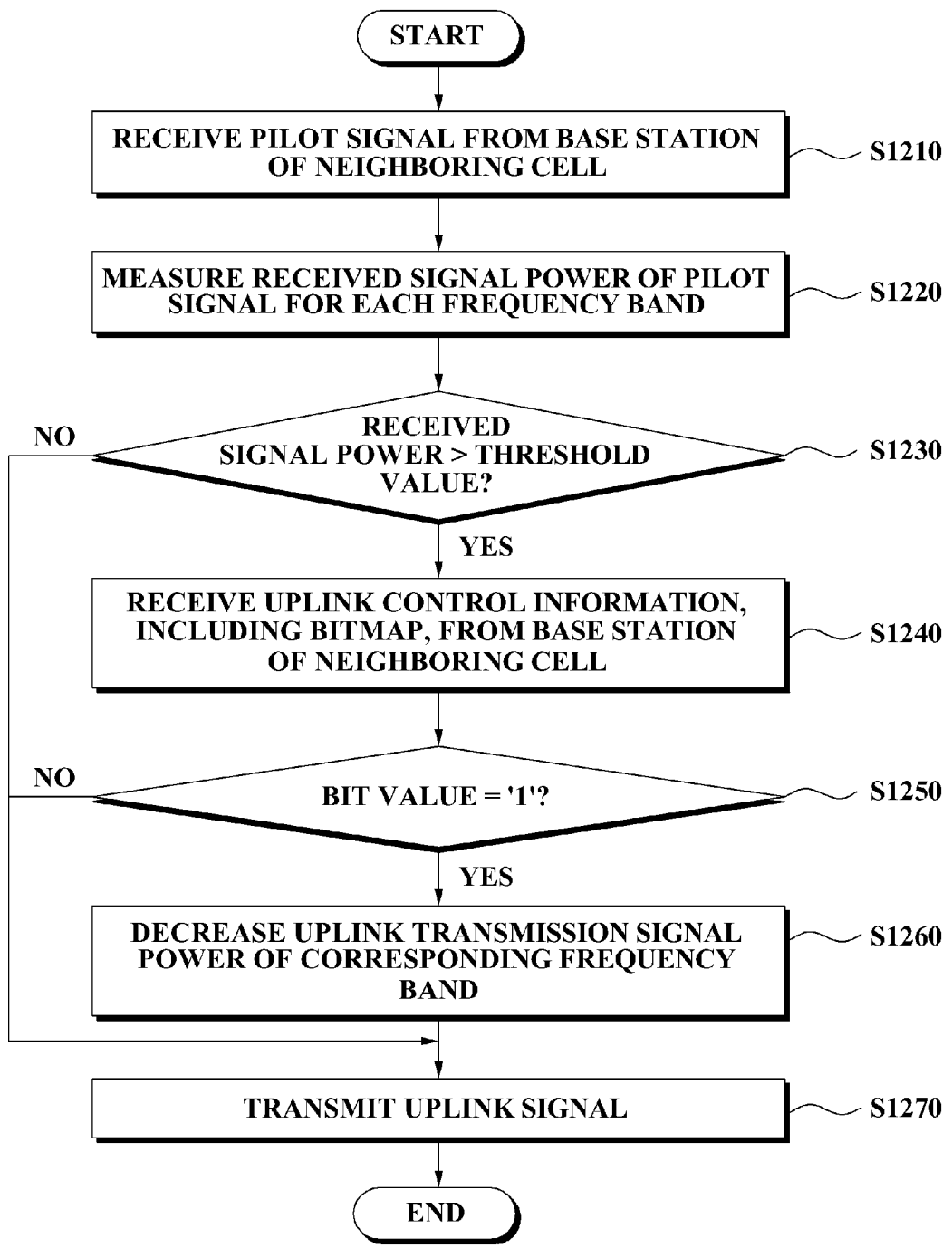
FIG. 12 is a flowchart illustrating a method for scheduling uplink resources according to another exemplary embodiment of the present invention.

FIG. 7, FIG. 8, and FIG. 9 are flowcharts illustrating methods for controlling ICI according to exemplary embodiments of the present invention. FIG. 10, FIG. 11, and FIG. 12 are flowcharts illustrating a method for scheduling uplink resources according to exemplary embodiments of the present invention.

Hereinafter, various exemplary embodiments of the present invention will be described with reference to FIG. 7, FIG. 8, FIG. 9, FIG. 10, FIG. 11, and FIG. 12. In this instance, FIG. 7, FIG. 8, and FIG. 9 are flowcharts illustrating operations performed in a base station. Also, FIG. 10, FIG. 11, and FIG. 12 are flowcharts illustrating operations performed in a terminal.

Referring to FIG. 7, in operation S710, a base station receives an uplink signal via a wireless antenna. The uplink signal may include a signal received from a terminal of a home cell, and a signal received from a terminal of a neighboring cell. An ICI amount measured with respect to an uplink resource of a neighboring cell, and an ICI amount measured with respect to the entire uplink resources may be included.

In operation S720, the base station measures a signal strength of the received uplink signal for each frequency band to obtain a signal strength measurement value for each frequency band. In the present exemplary embodiment, many frequency bands are used for uplink signal transmission/reception and signal strength for each frequency band is measured as ICI amount information.

In the present exemplary embodiment, ICI amount information extracted at the base station includes the signal strength of the uplink signal. However, as described above, the ICI amount information may be information having a correlation with an uplink channel response, such as a received signal power of an uplink signal or a received channel gain thereof, and may include any indices that may be represented as numerical values and thus are comparable. The present exemplary embodiment and other exemplary embodiments will be described for ICI amount information that is measured as the signal strength of the uplink signal.

In operation S730, the base station compares the signal strength measurement value for each frequency band with a predetermined threshold value, and determines whether to use a corresponding frequency band based on results of the comparison. More specifically, if the signal strength measurement value is greater than the threshold value, the base station determines to restrict use of the corresponding frequency band in operation S731. Conversely, if the signal strength measurement value is less than or equal to the threshold value, the base station determines to use the corresponding frequency band in operation S732. According to the present exemplary embodiment, the threshold value used for the comparison in operation S730 may be uniform with respect to the entire applicable frequency band.

In operation S740, the base station then generates uplink control information based on the determination from operation S731 and/or operation S732. Also, in operation S750, the base station transmits the generated uplink control information to a terminal in a neighboring cell to schedule uplink resources.

Specifically, according to the present exemplary embodiment, information about whether to use each frequency band for uplink transmission is included in the uplink control information.

FIG. 8 is a flowchart illustrating a method for controlling ICI according to still another exemplary embodiment of the present invention. In operation S810, a base station receives an uplink signal.

In operation S820, the base station measures a signal strength with respect to the entire frequency bands to obtain a signal strength measurement value for each frequency band of the entire frequency bands. In operation S820, the term "entire frequency bands" may refer to applicable frequency bands other than a frequency band associated with the home cell. Alternatively, the term "entire frequency bands" may indicate the entire applicable uplink frequency bands, including a frequency band allocated to the home cell and a frequency band allocated to a neighboring cell.

In operation S830, the base station compares the signal strength measurement value with a predetermined threshold value. If the signal strength measurement value is greater than the threshold value in operation S830, the base station decreases an uplink transmission signal power of a terminal in a neighboring cell in operation S831. The present exemplary embodiment may be applicable if an accumulated change of the signal strength measurement value is greater than the threshold value, or if a change trend in a particular direction continues for some amount time such that operation S831 is performed.

In operation S840, the base station generates uplink control information including information determined in operations S830 and/or S831. In operation S850, the base station transmits the generated uplink control information to a terminal of a neighboring cell.

FIG. 9 is a flowchart illustrating a method for controlling ICI according to another exemplary embodiment of the present invention. In operation S910, a base station receives an uplink signal.

In the exemplary embodiments shown in FIG. 7 and FIG. 8, ICI amount information is extracted by measuring signal strength. However, in the present exemplary embodiment shown in FIG. 9, the ICI amount information is extracted based on channel decoding. Specifically, the present exemplary embodiment may be applicable if the uplink signal is channel decoded and thereby transmitted.

More specifically, in the present exemplary embodiment, the results of channel decoding included in the ICI amount information may include information about whether the channel decoding fails or succeeds, and a data error rate if the channel decoding fails. In operation 5920, the base station performs channel decoding with respect to the received uplink signal and thereby attempts to acquire original data.

In operation 5930, the base station determines whether channel decoding fails or succeeds. If channel decoding fails, the base station decreases a transmission signal power of the uplink signal of a terminal for data transmission without error in operation 5931. Also, if a number of channel decoding failures is greater than a threshold value for a predetermined time, if a number of accumulated channel decoding failures is greater than the threshold value, or if the data error rate when the channel decoding fails is greater than a predetermined level, the base station may decrease the transmission signal power of the uplink signal.

Specifically, if the ICI amount measured at the base station is greater than or equal to a predetermined level based on the results of channel decoding, the base station may transmit information indicating a decrease in the uplink transmission signal to the terminal of the neighboring cell, thereby controlling the ICI.

Accordingly, in operation 5940, the base station generates uplink control information including information determined in operations 5930 and/or 5931. In operation S950, the base station transmits the generated uplink control information to the terminal of a neighboring cell so that the terminal may schedule uplink resources.

In this instance, the ICI amount information extracted at the base station according to each of the above-described exemplary embodiments may be extracted for each uplink frame or for each frame. Specifically, ICI amount information may be extracted per uplink frame unit and thereby fed back to the terminal of the neighboring cell.

Operations performed at the base station have been described with reference to FIG. 7, FIG. 8, and FIG. 9. Hereinafter, operations performed at a terminal will be described with reference to FIG. 10, FIG. 11, and FIG. 12.

FIG. 10 is a flowchart illustrating a method for scheduling uplink resources if the uplink resources include many frequency bands. In operation S1010, a terminal receives uplink control information from a base station of a neighboring cell. The uplink control information includes bitmap information indicating whether to use each frequency band.

In operation S1020, the terminal identifies each bit value of the bitmap information, and schedules the uplink resources based on the identification. In FIG. 10, for convenience of description, a bit value of '1' indicates a bit value to restrict a use of the corresponding frequency band.

If the bit value corresponding to a particular frequency band is '1' in operation S1020, the terminal may exclude the corresponding frequency band from the transmission frequency band in operation S1021. Conversely, if the bit value is not '1', the terminal may select or include the corresponding frequency band in the transmission frequency band in operation S1022. In operation S1030, the terminal may transmit the uplink signal to a base station of a home cell via the transmission frequency band selected according to the above-described scheme including operations S1021 and S1022.

FIG. 11 is a flowchart illustrating a method for scheduling uplink resources according to another exemplary embodiment of the present invention.

In operation S1110, a terminal receives uplink control information from a base station of a neighboring cell. In this instance, the uplink control information includes ICI amount information but may exclude associated frequency band information. The term "entire frequency band" may be used as described above with reference to FIG. 8.

Specifically, the uplink control information includes information about whether an ICI amount measured with respect to the entire frequency band is greater than a predetermined threshold value. Accordingly, the uplink control information may include information indicating a decrease in an uplink transmission signal power if the measured ICI amount is greater than the threshold value.

The above-described information may be represented as a single bit in its simplest form. However, the uplink control information may further include information indicating the extent to which the ICI amount is greater than the threshold value, which may be referred to as the "over amount information". This will be described in more detail below. Also, the ICI amount measured at the base station may be represented as a numerical value by using signal strength of an uplink signal, received signal power, or a number of channel decoding failures, and may be compared with the threshold value.

In operation S1120, the terminal determines whether the ICI amount is greater than the threshold value based on the uplink control information. If the ICI amount is greater than the threshold value and includes information indicating a decrease in a transmission signal power, the terminal may randomly select a predetermined ratio of frequency bands from the frequency bands in operation S1121. In operation S1122, the terminal may reduce the transmission signal power of the randomly selected frequency bands by a predetermined level. Accordingly, it is possible to control an ICI amount affecting the neighboring cell.

In operation S1130, the terminal transmits an uplink signal to the base station of a home cell using the selected frequency bands having reduced uplink transmission signal power.

In this instance, the predetermined ratio and the predetermined level may be determined by an amount by which the ICI amount exceeds the threshold value, or the over amount information. Specifically, since the uplink control information includes the over amount information, the terminal may determine a ratio of the randomly selected frequency bands and a decrease level in the uplink transmission signal power of the frequency band. Also, the base station may calculate the predetermined ratio and the predetermined level and then include the calculated ratio and the calculated level in the uplink control information when transmitting the uplink control information to the terminal.

Also, the terminal may control only the decrease level in the uplink transmission signal power by permanently setting the ratio to a predetermined value. Also, the terminal may control the ICI amount by permanently setting the decrease level in the uplink transmission signal power to a predetermined value, and using a calculated ratio of the frequency band from the base station. In any case, the decrease level or the frequency band ratio may increase as the over amount increases.

According to the present exemplary embodiment, if a base station cannot measure signal strength of an uplink signal for each frequency band, or if it decreases the size of uplink control information, it is possible to control ICI by decreasing uplink transmission signal power of a randomly selected frequency band.

Also, according to another exemplary embodiment of the present invention, a terminal receives a pilot signal from a base station, and measures a channel response for each frequency band by using the received pilot signal and therefore the terminal may schedule uplink resources.

Specifically, an uplink channel and a downlink channel have a predetermined correlation therebetween. Accordingly, if a downlink channel response for each frequency band is measured by using a pilot signal received via the downlink channel, it is possible to identify an uplink channel response for each frequency band by using the measured downlink channel response. More specifically, it is possible to determine a transmission signal power for each frequency band or to use a corresponding frequency band for uplink signal based on the measured downlink channel response.

For example, if a channel response for each frequency band is measured as signal strength of a pilot signal received from a base station of a neighboring cell, a frequency band causing ICI in the neighboring cell while a corresponding terminal performs uplink transmission can be estimated. Accordingly, if the signal strength of the pilot signal is greater than a predetermined threshold value, the terminal may decrease transmission signal power of the corresponding frequency band.

However, if a frequency band is not restricted for use by the base station, the ICI in the neighboring cell as a result of that frequency band may not be significant even though the corresponding frequency band is used. Accordingly, the terminal may determine the uplink transmission signal power of a particular frequency band or use of the particular frequency band by referring to the channel response measured from the pilot signal received from the base station of the neighboring cell, and the uplink control information received from the base station of the neighboring cell.

FIG. 12 is a flowchart illustrating a method for scheduling uplink resources 594 according to another exemplary embodiment of the present invention.

In operation S1210, a terminal receives a pilot signal from a base station of a neighboring cell. The pilot signal may be a common pilot channel signal that is common between neighboring cells.

In operation S1220, the terminal measures a downlink channel response via a received signal power of the pilot signal for each frequency band. As described above, the downlink channel response may be measured by signal strength or received channel gain as well as received signal power.

In operation S1230, the terminal compares the received signal power for each frequency band with a predetermined threshold value. If the received signal power of a corresponding frequency band is greater than the threshold value, operations S1240, S1250, S1260, and S1270 may be performed.

If the received signal power of a corresponding frequency band is greater than the threshold value, the terminal receives uplink control information from a base station of a neighboring cell in operation S1240. The uplink control information may include various types of information associated with scheduling of uplink resources. However, in the present exemplary embodiment, the uplink control information includes bitmap information indicating whether to use each frequency band corresponding to the uplink resources.

In operation S1250, the terminal determines whether to use the corresponding frequency band from each bit value of the bitmap information, and performs an operation associated with scheduling the uplink resources. If the bit value indicates a restriction on the use of the corresponding frequency band, operation S1260 is performed. In operation S1260, an uplink transmission signal power of the corresponding frequency band is decreased. Also, in operation S1260, the use of the corresponding frequency band may be restricted by setting the transmission signal power of the corresponding frequency band to 0 watts.

Through the above method, if a received signal power of a downlink channel, which is measured by a base station of a neighboring cell, is greater than a predetermined threshold value, and use restriction information of a corresponding frequency band is included in uplink control information received from the base station of the neighboring cell, the terminal decreases an uplink transmission signal power of the corresponding frequency band, and thereby may control ICI by referring to the channel response measured by the terminal and ICI amount information measured at the base station of the neighboring cell.

In FIG. 7, FIG. 8, FIG. 9, FIG. 10, FIG. 11, and FIG. 12, the exemplary embodiments are described for only one neighboring cell, which is for convenience of description. However, the present invention is not limited thereto and the exemplary embodiments of the present invention may be applicable if many neighboring cells exist. Specifically, two or more neighboring cells may create ICI based on a location of terminals in these cells. In this instance, each terminal may receive uplink control information from a base station from each neighboring cell, and may determine uplink transmission signal power for each frequency band based on the received uplink control information.

Also, the terminal may receive a common pilot channel signal from a base station of each neighboring cell, and determine an uplink transmission signal power by sequentially or simultaneously considering the downlink channel response of each neighboring cell.

Specifically, if the terminal determines a frequency band of which use is restricted or of which a transmission signal power is decreased according to a measured channel response for each frequency band, but uplink control information received from the base stations of the neighboring cells does not indicate a restriction on the use of the frequency band, the terminal may use of the frequency band.

Conversely, if uplink control information received from a base station in a neighboring cell indicates a restriction on a use of a particular frequency band, and a channel gain of the frequency band is less than a predetermined threshold value based on a pilot signal received from the base station of the neighboring cell, the terminal may use the corresponding frequency band for an uplink signal since the corresponding frequency may not cause significant ICI to any neighboring cell.

Accordingly, if the signal strength of the pilot signal received from the base station of the neighboring cell is greater than the threshold value, and at the same time, uplink control information received from the base station of the neighboring cell indicates the restriction on the use of the corresponding frequency band, the terminal may restrict the use of the corresponding frequency band or decrease the transmission signal power and thereby more effectively control ICI.

Also, the terminal may select a transmission frequency band by considering only a downlink channel response of a neighboring cell that may cause ICI, or may determine a power of the transmission frequency band. For example, the terminal may select only a predetermined number of high rank frequency bands based on signal power of a common pilot channel signal received from a base station of each neighboring cell, or based on the mean of the received signal strength, and thereby enable the selected frequency band to control the transmission signal power of the transmission frequency band.

Also, it is possible to assign a different weight value based on the mean value with respect to each neighboring cell, and thereby reflect the downlink channel response of the neighboring cells to determine the transmission signal power for each frequency band.

According to another exemplary embodiment of the present invention, a terminal may determine an uplink transmission signal power for each frequency band by additionally referring to uplink control information received from a base station of a home cell. In this instance, the uplink control information may include an uplink received signal power value measured at the base station of either the home cell or a neighboring cell.

For example, if a downlink channel response of each neighboring cell and a home cell is measured as signal power of a signal received from a base station of the home cell and each neighboring cell, the transmission signal power may be determined by comparing the ratio of the received signal power of the signal received from each base station with a predetermined ratio threshold value for each frequency band. Specifically, if the signal power of the signal received from the home cell base station is $P_1$, and the signal power of the signal received from the neighboring cell base station is $P_2$, transmission signal power of a frequency band where the ratio $P_2/P_1$ of two received signal powers is greater than the threshold value may be set to be a value less than the transmission signal power of another frequency band, where $P_2/P_1$ is less than or equal to the threshold value.

More specifically, it is possible to arrange the frequency bands based on the ratio of the received signal powers and determine the transmission signal power for each frequency band based on the arranged order. In this instance, the ratio of the received signal powers may be a weighted ratio that reflects a weight value for each received signal power. Also, the weight value may have a different value for each frequency band. For example, the weight value may reflect a transmitting/receiving profile between the terminal and the base station. Specifically, a comparatively greater weight value may be assigned to a channel over which data is stably transmitted and received for at least a predetermined time. Also, the terminal may determine the weight value based on weight value information received from the base station. Specifically, the base station may transmit the weight value information by considering the channel status associated with the terminal of the home cell and also the channel status associated with the terminal of the neighboring cell. Also, the terminal may determine the weight value by referring to various types of information, such as relative location from the base station such as a cell boundary location, and a number of terminals located in the home cell.

As described above, when using a resource management scheme based on the ICI caused at the neighboring cell and also a data transmission channel status, the ICI to the neighboring cell may be reduced. Also, a frequency band with a good channel status may be selected. Also, when adjusting an optimum weight value, the entire system capacity may be maximized.

According to still another exemplary embodiment of the present invention, the terminal may consider the downlink channel status of the neighboring cell.

In this instance, if there are few or no frequency bands where the received signal power of the pilot signal received from the base station in the home cell is greater than a predetermined threshold value, the downlink channel response of the home cell may be poor. Accordingly, rather than restricting the use of any particular frequency band to prevent ICI in a neighboring cell, the terminal may use all applicable frequency bands for data transmission to the base station in the home cell. Accordingly, if the downlink channel response of the home cell is poor, data may be transmitted to the base station of the home cell by using the entire frequency band.

However, if there are many frequency bands where the received signal power is greater than the threshold value, data may be transmitted in the diversity mode even though some frequency bands are restricted. Accordingly, in this case, as described above, the downlink channel response associated with the neighboring cell may be measured to thereby restrict the use of the frequency band based on the measured downlink channel response.

The ICI control method and uplink resource scheduling method according to the above-described exemplary embodiments of the present invention may be recorded in computer-readable media including program instructions to implement various operations embodied by a computer. The media may also include, alone or in combination with the program instructions, data files, data structures, and the like. Examples of computer-readable media include magnetic media such as hard disks, floppy disks, and magnetic tape; optical media such as CD ROM disks and DVD; magneto-optical media such as optical disks; and hardware devices that are specially configured to store and perform program instructions, such as read-only memory (ROM), random access memory (RAM), flash memory, and the like. The media may also be a transmission medium such as optical or metallic lines, wave guides, etc. including a carrier wave transmitting signals specifying the program instructions, data structures, etc. Examples of program instructions include both machine code, such as that produced by a compiler, and files containing higher level code that may be executed by the computer using an interpreter. The described hardware devices may be configured to act as one or more software modules in order to perform the operations of the above-described exemplary embodiments of the present invention.

Figure 13:
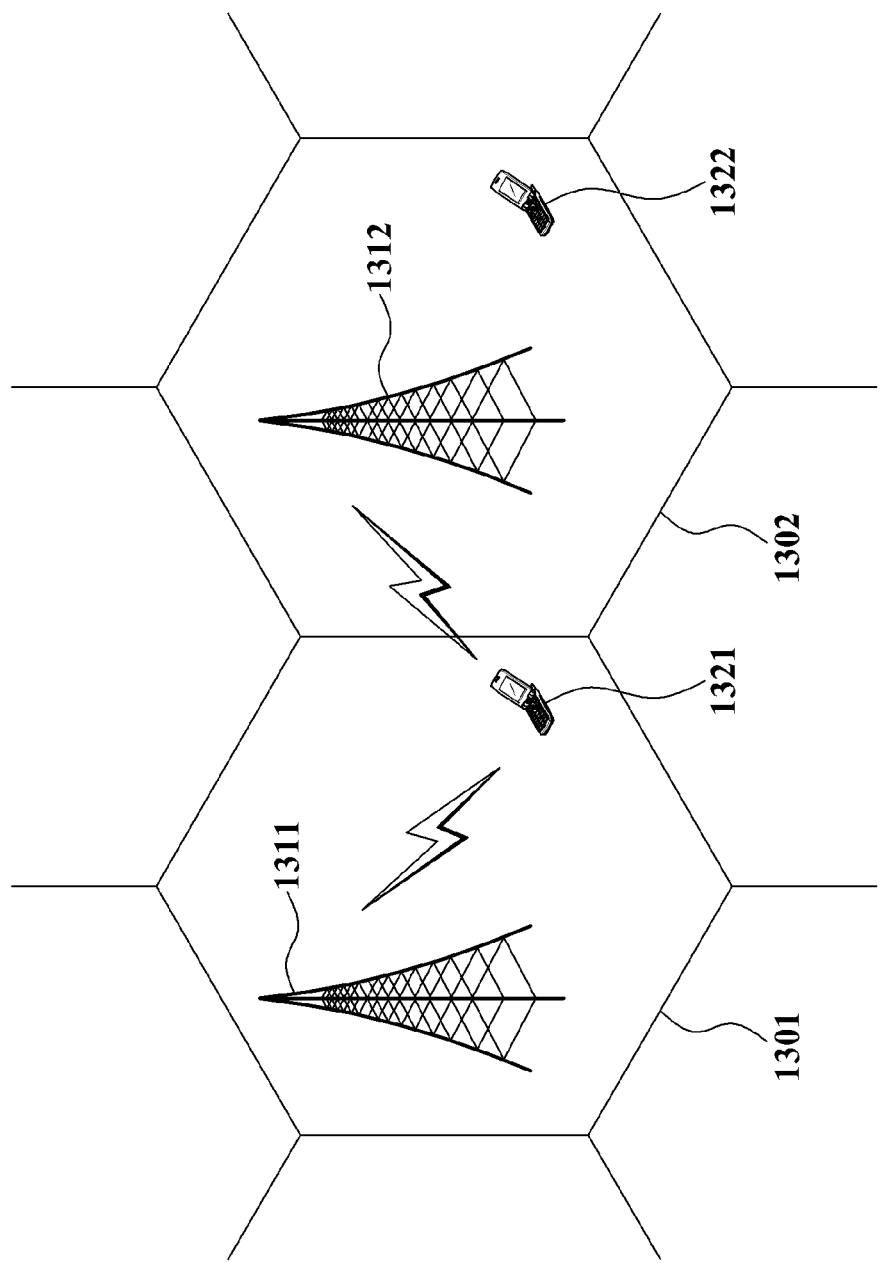
FIG. 13 illustrates two neighboring cells in a mobile communication system according to an exemplary embodiment of the present invention.

FIG. 13 illustrates two neighboring cells in a mobile communication system according to an exemplary embodiment of the present invention. The mobile communication system shown in FIG. 13 includes a first base station 1311, a second base station 1312, a first terminal 1321 included in a first cell 1301, and a second terminal 1322 included in a second cell 1302, which neighbors the first cell. The first terminal 1321 and the second terminal 1322 transmit and receive wireless signals with the first base station 1311 and the second base station 1312.

Figure 14:
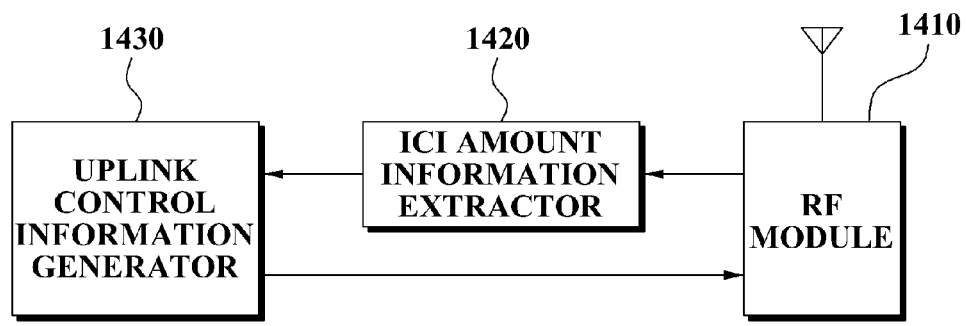
FIG. 14 is a block diagram illustrating an internal configuration of a base station included in the mobile communication system of FIG. 13.

FIG. 14 is a block diagram illustrating an internal configuration of a base station included in the mobile communication system of FIG. 13. The internal configuration may be applied to the first base station 1311 and/or the second base station 1312, but will be described only for the first base station 1311 for convenience.

The first base station 1311 includes a radio frequency (RF) module 1410 to receive an uplink signal via a wireless antenna. The received uplink signal is transmitted to an ICI amount information extractor 1420.

The ICI amount information extractor 1420 measures the signal strength of the uplink signal, the received signal power thereof, and the received channel gain, and extracts ICI amount information including at least one of these measurement values. The extracted ICI amount information is transferred to an uplink control information generator 1430.

The uplink control information generator 1430 generates the uplink control information based on the extracted ICI amount information. The uplink control information is transmitted from the RF module 1410 to the second terminal 1322. According to an exemplary embodiment, the uplink control information may include information associated with an increase or decrease in an uplink transmission signal power in the second terminal 1322. For example, if the ICI amount information includes the signal strength of the uplink signal, and a signal strength measurement value is greater than a predetermined threshold value, the uplink control information may include information instructing the second terminal 1322 to decrease the uplink transmission signal power.

According to another exemplary embodiment of the present invention, the uplink control information may include information indicating an increase or decrease in the uplink transmission signal power for each frequency band, or whether to use each frequency band. Specifically, if the ICI amount information includes the signal strength of the uplink signal, and the signal strength measurement value for each frequency band is greater than the threshold value, the uplink control information may include information indicating a use restriction for a corresponding frequency band or a decrease in a transmission signal power of the corresponding frequency band. Conversely, if a signal strength measurement value for each frequency band for a pilot signal received at the second terminal 1322 from the second cell 1312, which is the home cell for the second terminal 1322, is less than the threshold value, the second terminal 1322 may not perform the above operation to avoid the risk of data transmission error to the home cell.

Figure 15:
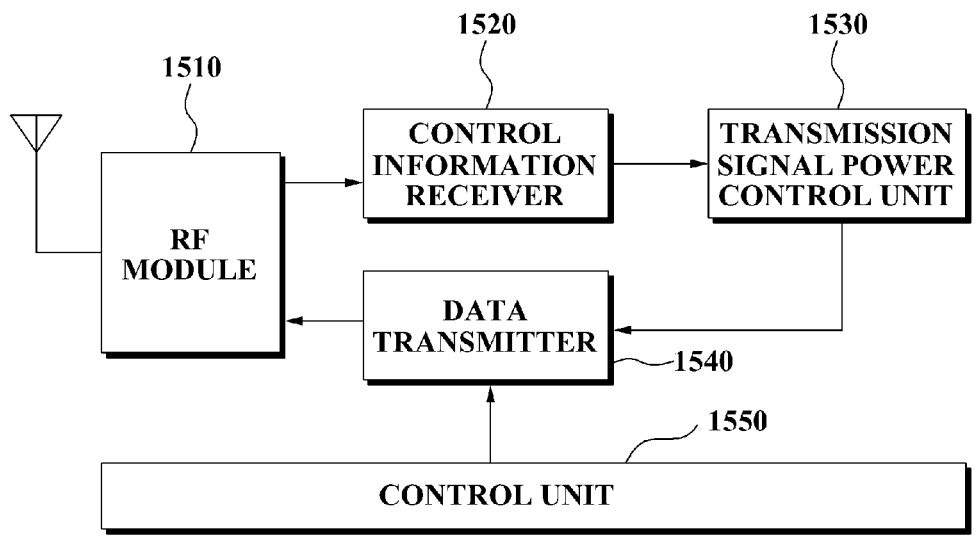
FIG. 15 is a block diagram illustrating an internal configuration of a terminal included in the mobile communication system of FIG. 13.

FIG. 15 is a block diagram illustrating an internal configuration of a terminal included in the mobile communication system of FIG. 13. The internal configuration may be applied to the first terminal 1321 and/or the second terminal 1322, but will be described only for the first terminal 1321 for convenience.

The first terminal 1321 includes an RF module 1510, a control information receiver 1520, a transmission signal power control unit 1530, a data transmitter 1540, and a control unit 1550.

The RF module 1510 is connected to an antenna, and transmits and receives signals with a base station via a wireless frequency band. The control information receiver 1520 extracts uplink control information from a signal received from a base station via the RF module 1510.

In this instance, the extracted uplink control information may include bitmap information associated with the frequency bands. For example, if the mobile communication system uses N frequency bands, the length of the bitmap information may be N bits. Also, each bit value included in the bitmap information may include information indicating whether to use a corresponding frequency band for uplink data transmission, or to decrease or increase transmission signal power of the corresponding frequency band.

The transmission signal power control unit 1530 determines an uplink transmission signal power based on the uplink control information received via the control information receiver 1520. According to the above-described exemplary embodiment, for example, if the bitmap information included in the uplink control information indicates a use restriction for a particular frequency band, the particular frequency band may be excluded from the transmission frequency band. Also, if the bitmap information indicates the decrease in the transmission signal power of the particular frequency band, the transmission signal power of the corresponding frequency band may be decreased by a predetermined level.

However, if the uplink control information indicates a decrease in the entire uplink transmission signal power without information associating the decrease with a frequency band, the transmission signal power control unit 1530 may decrease the uplink transmission signal power with respect to the entire applicable frequency band by the predetermined level, or may decrease the uplink transmission signal power of a predetermined ratio of frequency bands that are randomly selected from the entire applicable frequency band.

The data transmitter 1540 transmits data to the first base station 1311, which is the home cell of the first terminal 1321, via the RF module 1510 according to the uplink transmission signal power determined by the transmission signal power control unit 1530.

The control unit 1550 transfers data to be transmitted to the first base station 1311 of the home cell to the data transmitter 1540, and generates a control signal for controlling the configuration elements of the first terminal 1321. The control unit 1550 may include a microprocessor, a digital signal processor (DSP), an application specific integrated circuit (ASIC) chip for performing the functions, and/or a memory to store transmission data.

According to the present exemplary embodiments, the first terminal 1321 may include a channel estimator (not shown) to receive a pilot signal from the second base station 1312 of the neighboring cell, and to estimate an uplink channel response to the first base station 1311 based on the received pilot signal. The uplink transmission signal power may be controlled by additionally referring to the uplink channel response.

The term "terminal" referred to throughout the specification may include any mobile communication device, such as a Personal Digital Cellular (PDC) phone, a personal communication service (PCS) phone, a personal handyphone system (PHS) phone, a Code Division Multiple Access (CDMA)-2000 (1X, 3X) phone, a Wideband CDMA phone, a dual band/dual mode phone, a Global System for Mobile Communications (GSM) phone, a mobile broadband system (MBS) phone, a Digital Multimedia Broadcasting (DMB) phone, a smart phone, and an OFDM or OFDMA communication terminal; a portable terminal such as a personal digital assistant (PDA), a hand-held PC, a notebook PC, a laptop computer, a wireless broadband Internet (WiBro) terminal, an MP3 player, and an MD player; and any types of hand-held based wireless communication devices including an International Mobile Telecommunication (IMT)-2000 providing international roaming service and extended mobile communication service. Also, the terminal may include a predetermined communication module such as a CDMA module, a Bluetooth module, an Infrared Data Association (IrDA) module, a wired/wireless LAN card and a wireless communication device which is provided with a global positioning system (GPS) chip enabling tracking of a position via a GPS. Also, the terminal may include a microprocessor that can play multimedia and perform a certain calculation operation, and thereby may perform calculation operations.

A mobile communication system, a base station, and a terminal included in the mobile communication system according to exemplary embodiments of the present invention have been described above with reference to FIG. 13, FIGS. 14, and 15. Descriptions related to the ICI control method and uplink resource scheduling method described with reference to FIG. 4, FIG. 5, FIG. 6, FIG. 7, FIG. 8, FIG. 9, FIG. 10, FIG. 11, and FIG. 12 may be applicable to the mobile communication system, the base station, and the terminal, and further detailed descriptions will be omitted here.

As described above, an ICI control method according to the exemplary embodiments of the present invention and a mobile communication system employing the method may control an uplink transmission signal power of a terminal based on ICI amount information measured at a base station, and thereby may control the ICI without a separate service control point (SCP) or a mobile switching center (MSC).

Accordingly, a method is disclosed for identifying a fixed frequency band that may reduce effective operation of wireless resources and eliminating the frequency band to enable flexible cell planning.

Also, it is possible to transmit data in a diversity mode within a frequency band selected for a current channel status and to use frequency diversity effect more appropriately.

Also, according to exemplary embodiments of the present invention, it is possible to use a normal MAP. Also, a method for informing a location and quality of data in a frame may be simplified. Accordingly, unnecessary overhead may be eliminated and the entire system throughput may be improved.

Also, according to exemplary embodiments of the present invention, uplink resources may be more adaptively managed based on channel status without pre-fixing a location and range of frequency band having limited use.

Also, according to exemplary embodiments of the present invention, frequency bands may be excluded or selected for lower power use based on a predetermined threshold value. Accordingly, ICI may be more effectively controlled by changing a number and power of frequency bands to be used for data transmission based on a channel status.

Also, according to exemplary embodiments of the present invention, an ICI amount may be more accurately measured to reduce ICI by reflecting long-term fading characteristics, which are determined based on topographical characteristics, and short-term fading characteristics, which change over time.

Also, according to exemplary embodiments of the present invention, an uplink transmission signal power of a terminal of a neighboring cell may be controlled based on ICI amount information measured at a base station, to thereby acquire an optimum value of an uplink transmission signal power for each terminal to reduce ICI through a feedback process.

Also, according to exemplary embodiments of the present invention, uplink transmission signal power may be controlled based on ICI amount information measured at a base station, and a channel response for each frequency band measured by a terminal, to thereby more effectively control an uplink transmission signal power for each frequency band.

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A method for controlling inter-cell interference in a mobile communication system, comprising:
   receiving a first uplink signal at a base station in a first cell;
   extracting inter-cell interference amount information associated with the base station in the first cell from the first uplink signal;
   generating uplink control information based on the inter-cell interference amount information; and
   transmitting the uplink control information to a mobile communication terminal located in a second cell neighboring the first cell,
   wherein the mobile communication terminal schedules an uplink resource based on the uplink control information and generates a second uplink signal.

2. A method for scheduling an uplink resource in a mobile communication terminal located in a first cell, comprising:
   receiving uplink control information from a base station in a second cell neighboring the first cell, the uplink control information comprising an inter-cell interference amount information measured at the base station in a second cell; and
   determining a transmission signal power for each frequency band of an uplink signal by referring to the uplink control information,
   wherein the inter-cell interference amount information comprises a signal strength measurement value of the uplink signal, the uplink signal being transmitted from a resource unassociated with uplink data transmission of the base station in the second cell.

3. A method for scheduling an uplink resource in a mobile communication terminal located in a first cell, comprising:
   receiving a signal via a downlink channel from a base station in a second cell neighboring the first cell;
   measuring a channel response of each frequency band from the received signal; and
   scheduling the uplink resource by referring to the channel response of each frequency band.

4. The method of claim 3, wherein the signal comprises a signal which is able to measure a response of the downlink channel.

5. The method of claim 3, wherein the uplink resource comprises a plurality of frequency bands.

6. The method of claim 3, wherein the uplink resource comprises transmission signal power information about each frequency band.

7. The method of claim 3, further comprising determining the uplink transmission signal power by referring to an uplink control information.

8. The method of claim 7, wherein the uplink control information is transmitted from the base station in the second cell.

9. The method of claim 8, wherein the uplink control information comprises an inter-cell interference amount information which includes a signal strength measurement value of a signal that is received by a resource unassociated with uplink data transmission of the base station in the second cell.

10. The method of claim 8, wherein the uplink control information comprises an inter-cell interference amount information which includes a signal strength measurement value of a signal that is received by entire uplink resource including both an uplink resource associated with a base station in a first cell and the base station in the second cell.

11. The method of claim 3, further comprising decreasing the uplink transmission signal power for a frequency band in which the uplink channel response is in a good state toward the base station in the second cell.

12. The method of claim 3, wherein the mobile communication terminal is applied a wireless system using an orthogonal frequency division multiplexing (OFDM) scheme.

13. The method of claim 3, wherein data is transmitted and received based on a Time Division Duplexing (TDD) scheme.

14. A mobile communication system, comprising:
a mobile communication terminal arranged in a first cell; and
a base station to provide wireless communication services to a second cell neighboring the first cell,
wherein the mobile communication terminal comprises:
a RF module to receive a signal via a downlink channel from a base station in a second cell;
a control unit to measure a channel response of each frequency band from the received signal and to schedule an uplink resource by referring to the channel response of each frequency band.

15. The mobile communication system of claim 14, wherein the signal comprises a signal which is able to measure a response of the downlink channel.

16. The mobile communication system of claim 14, wherein the uplink resource comprises a plurality of frequency bands.

17. The mobile communication system of claim 14, wherein the uplink resource comprises transmission signal power information about each frequency band.

18. The mobile communication system of claim 14, wherein the control unit comprises a transmission signal power control unit that determines uplink transmission signal power by additionally referring to an uplink control information.

19. The mobile communication system of claim 18, wherein the uplink control information is transmitted from the base station in the second cell.

20. The mobile communication system of claim 19, wherein the uplink control information comprises an inter-cell interference amount information which includes a signal strength measurement value of a signal that is received by a resource unassociated with uplink data transmission of the base station in the second cell.

21. The mobile communication system of claim 19, wherein the uplink control information comprises an inter-cell interference amount information which includes a signal strength measurement value of a signal that is received by entire uplink resource including both an uplink resource associated with a base station in a first cell and the base station in the second cell.

22. The mobile communication system of claim 14, wherein control unit comprises a transmission signal power control unit that decreases uplink transmission signal power for a frequency band in which the uplink channel response is in a good state toward the base station in the second cell.

23. The mobile communication system of claim 14, wherein the mobile communication system is a wireless system using an orthogonal frequency division multiplexing (OFDM) scheme.

24. The mobile communication system of claim 14, wherein data is transmitted and received based on a Time Division Duplexing (TDD) scheme.

* * * * *